Figure 8:
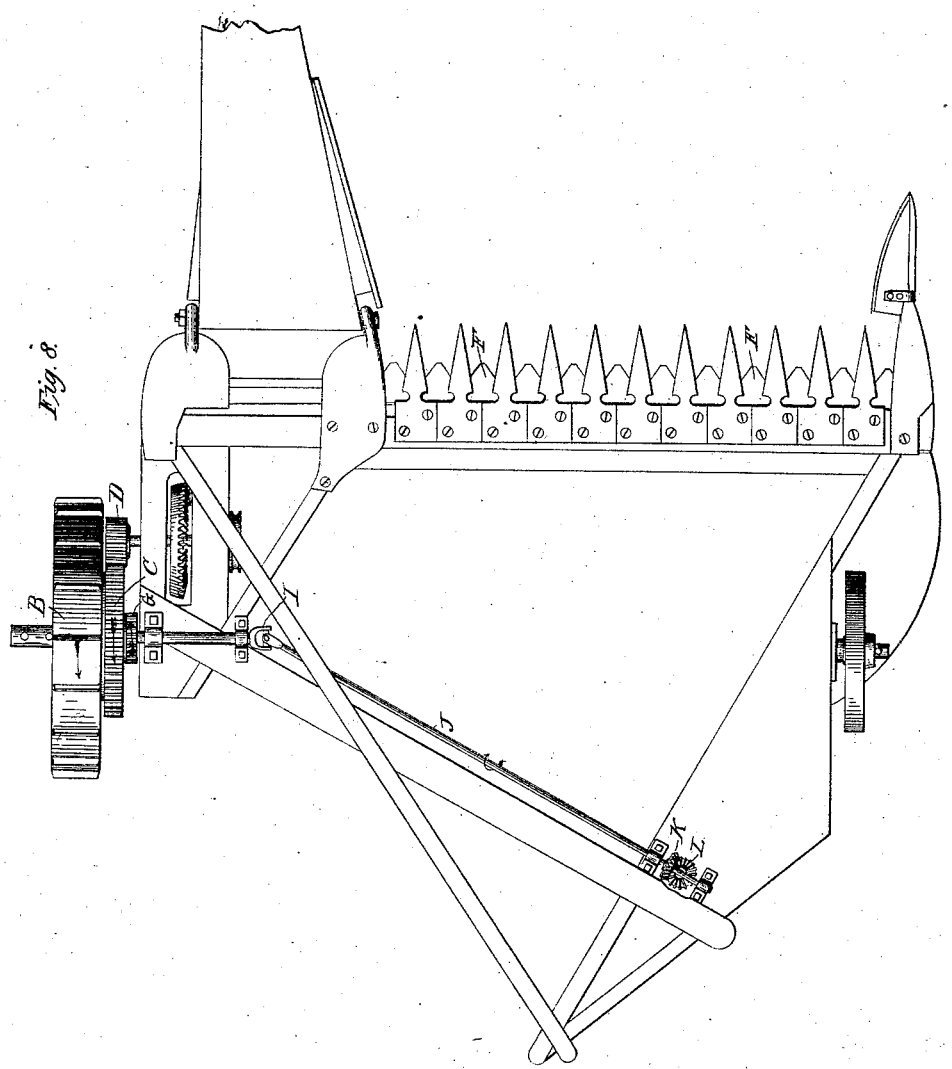

T. F. KUMS.
HARVESTER RAKE.
No. 33,418.
7 Sheets—Sheet 1
Patented Oct. 1, 1861
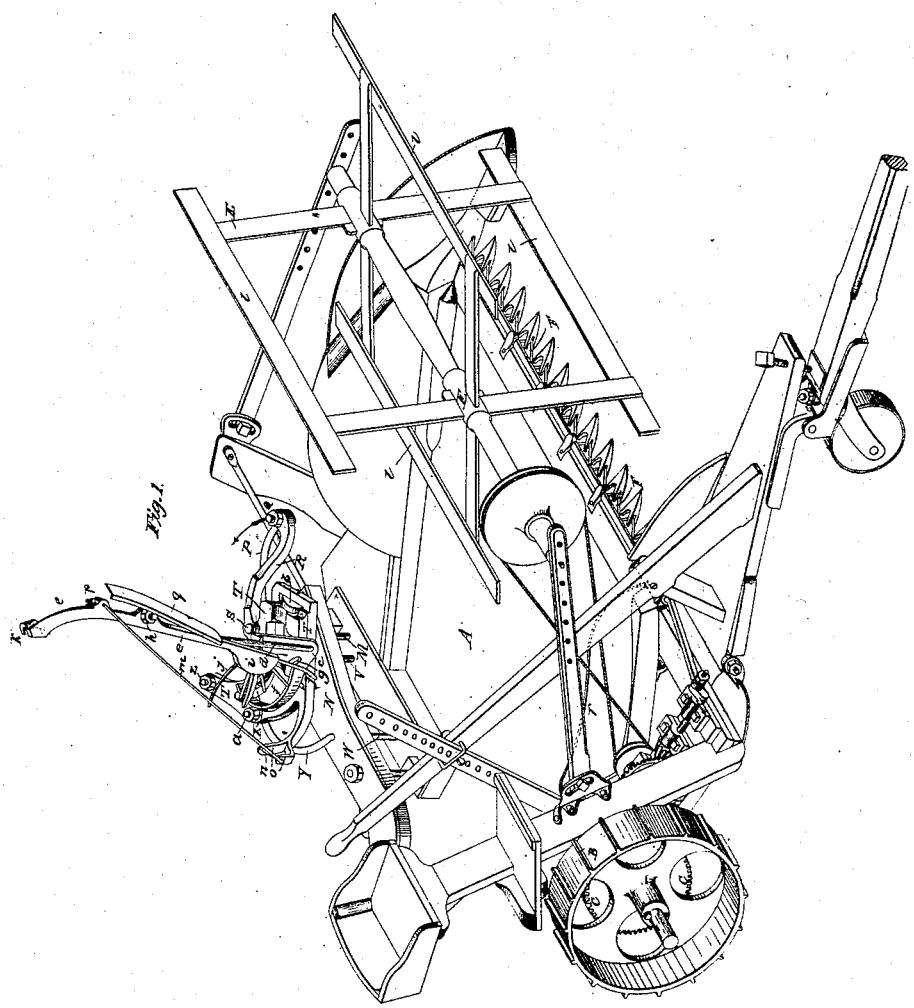

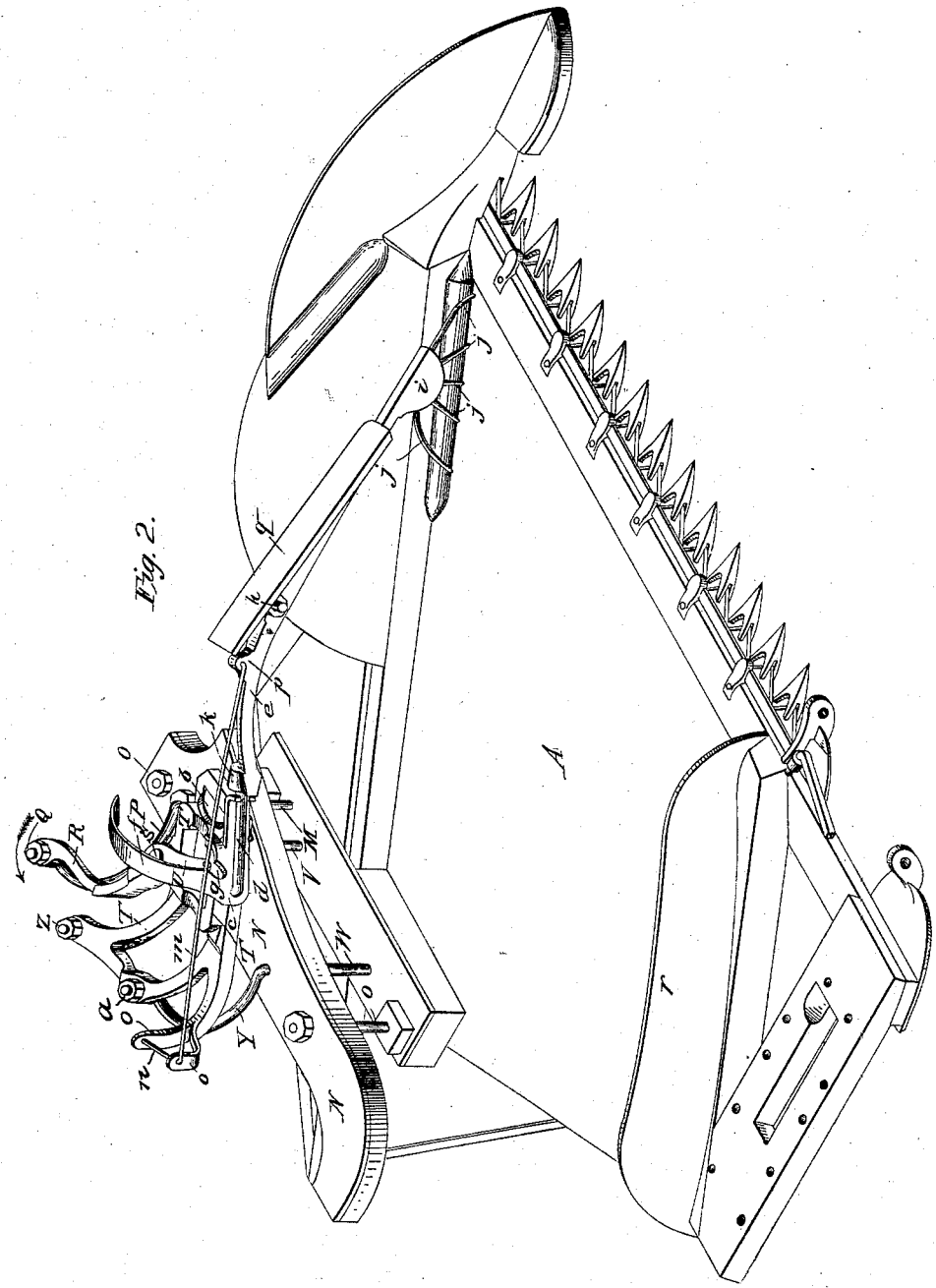

T. F. KUMS.
HARVESTER RAKE.
No. 33,418.
7 Sheets—Sheet 3.
Patented Oct. 1, 1861.
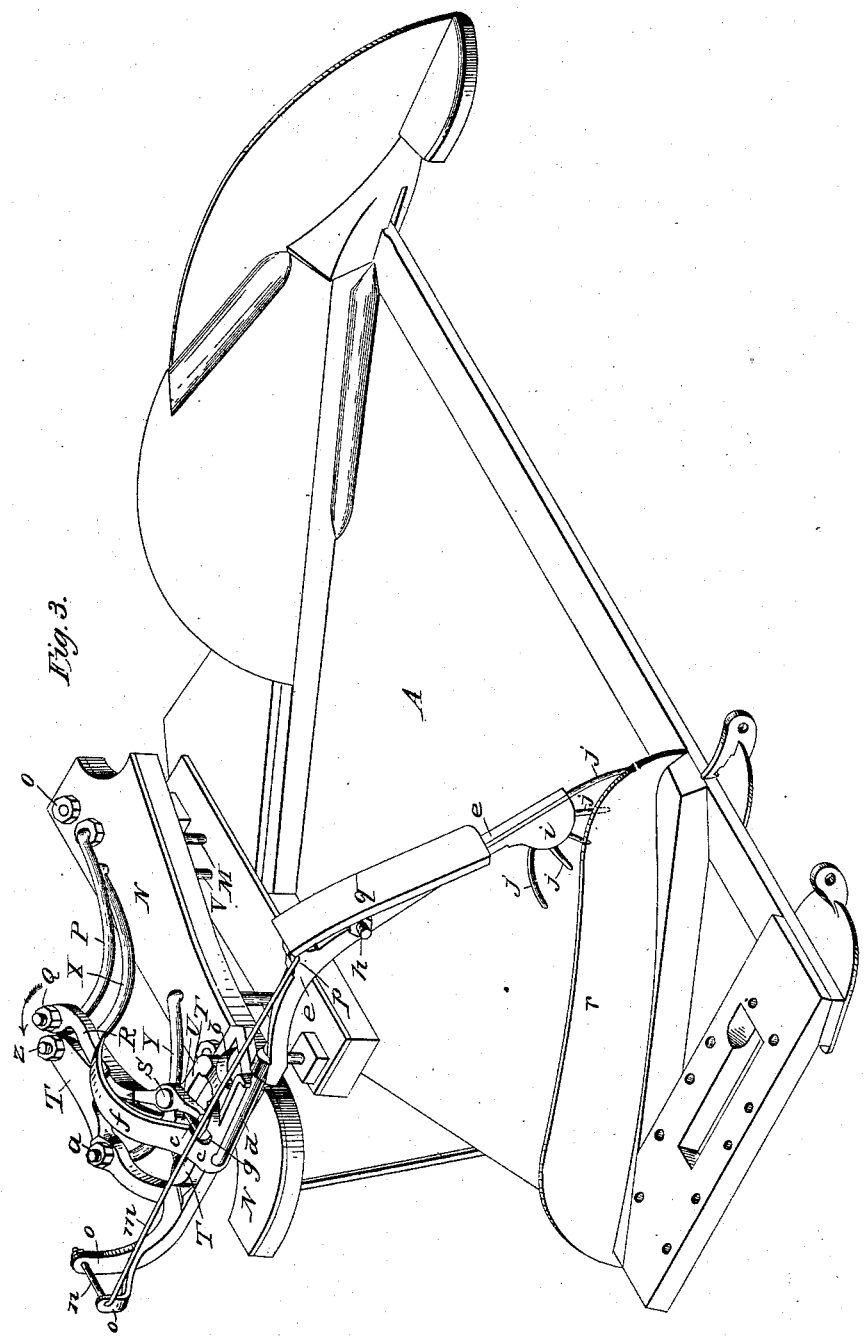

7 Sheets—Sheet 4.
T. F. KUMS.
HARVESTER RAKE.
No. 33,418. Patented Oct. 1, 1861.
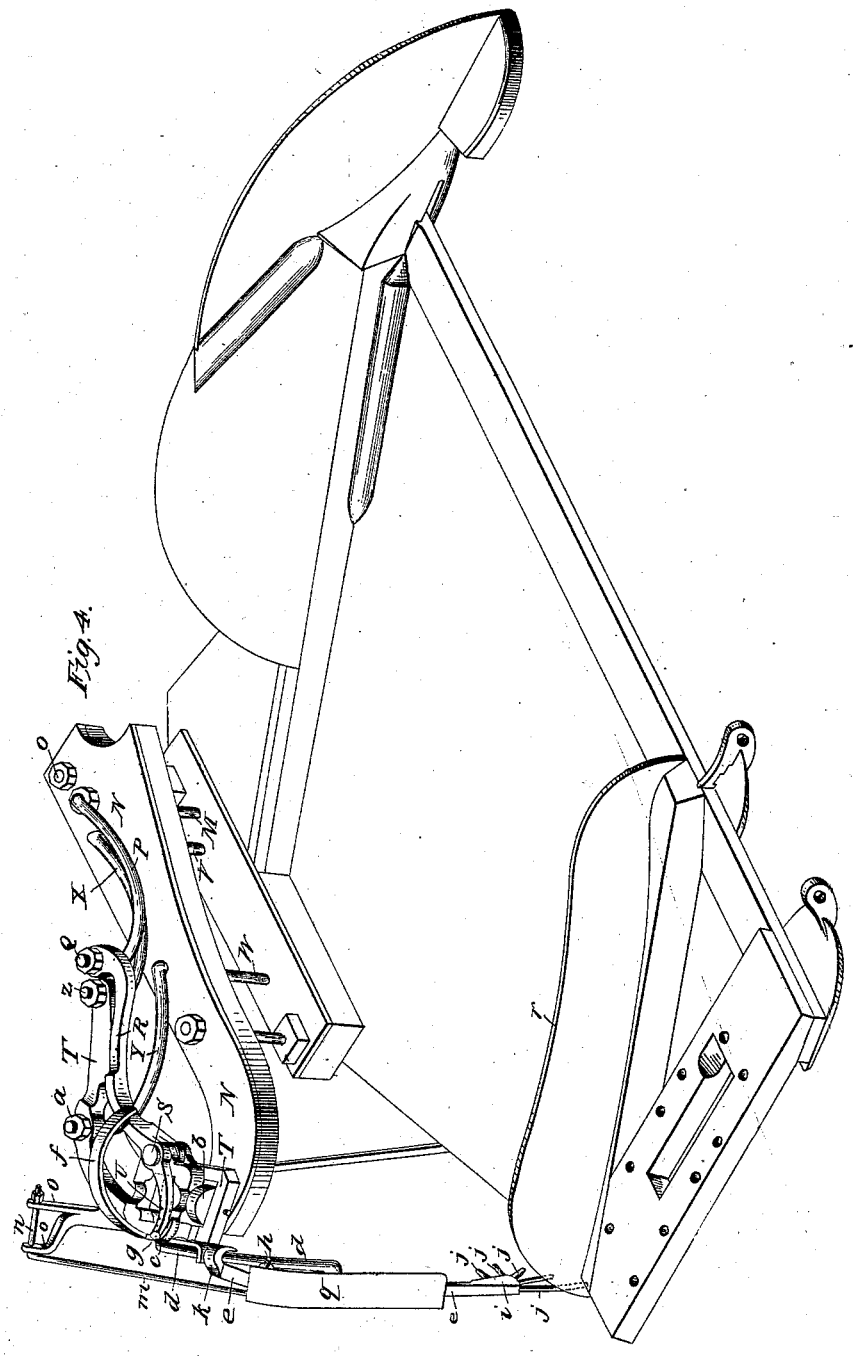

T. F. KUMS.
HARVESTER RAKE.
No. 33,418.
7 Sheets—Sheet 5.
Patented Oct. 1, 1861.
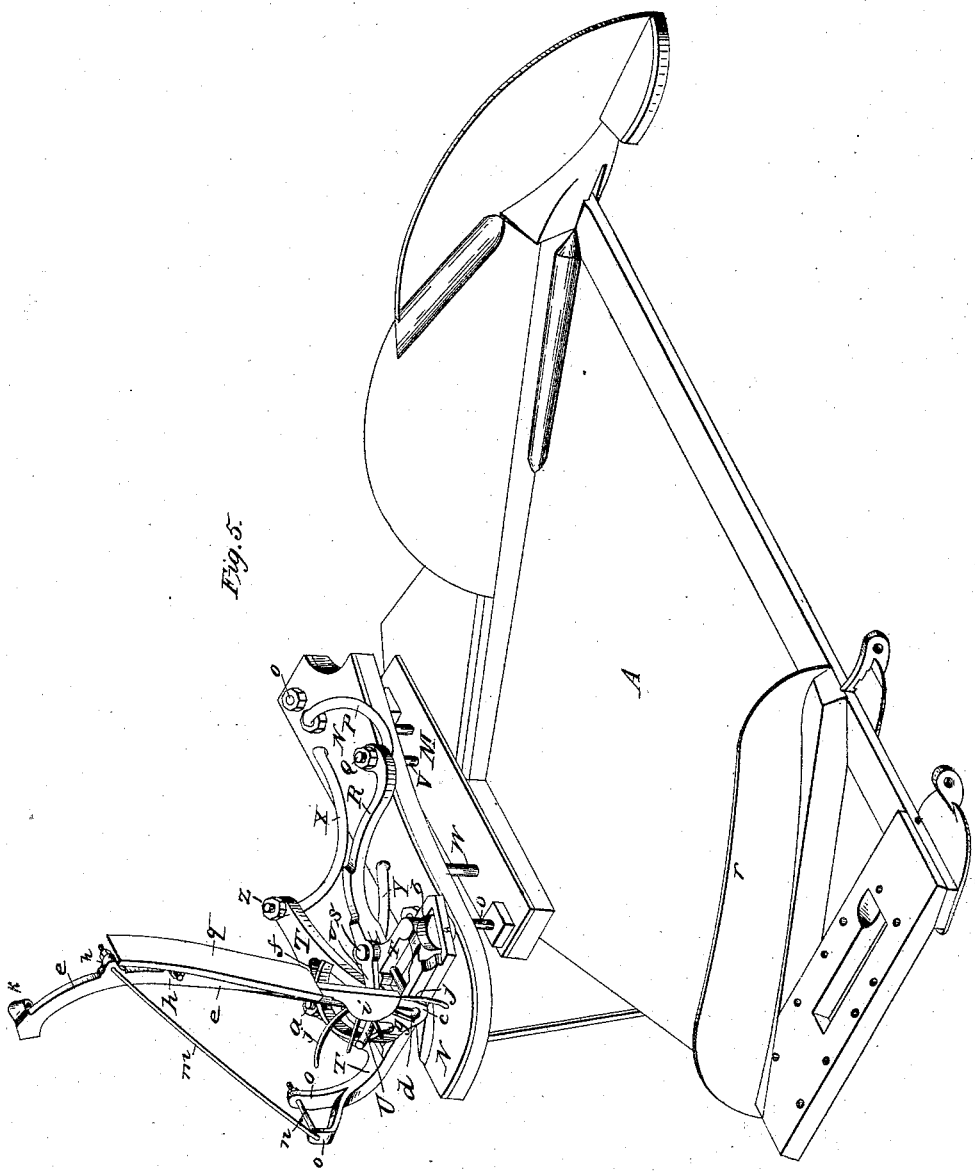

7 Sheets—Sheet 6.
T. F. KUMS.
HARVESTER RAKE.
No. 33,418. Patented Oct. 1, 1861.
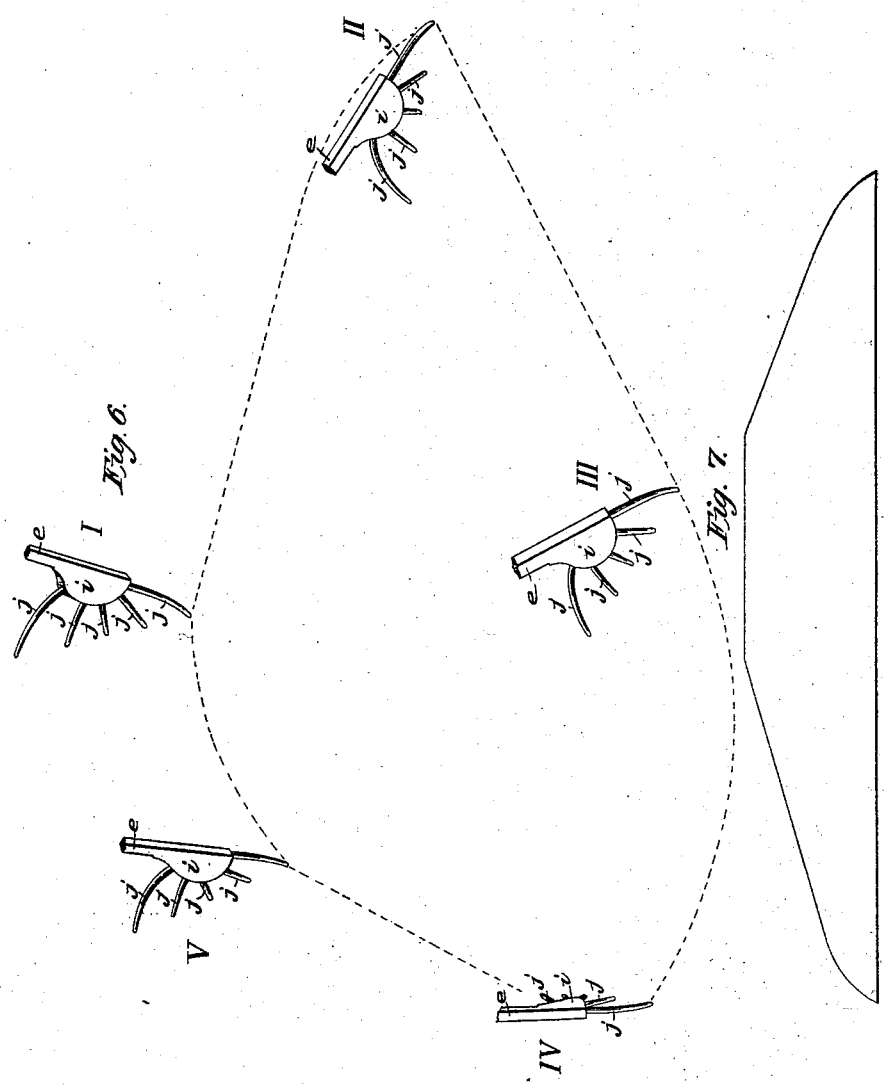

7 Sheets—Sheet 7.

T. F. KUMS.
HARVESTER RAKE.

No. 33,418. Patented Oct. 1, 1861.

UNITED STATES PATENT OFFICE.

THEODORE F. KUMS, OF ROCKFORD, ILLINOIS, ASSIGNOR TO MARY MANNY, OF SAME PLACE.

IMPROVEMENT IN AUTOMATIC RAKES FOR HARVESTERS.

Specification forming part of Letters Patent No. 33,418, dated October 1, 1861.

*To all whom it may concern:*

Be it known that I, THEODORE F. KUMS, of Rockford, in the county of Winnebago and State of Illinois, have invented certain new and useful Improvements in Automatic Rakes for Harvesting-Machines, of which the following is a full, clear, and exact description, reference being had to the accompanying drawings, making part of this specification, in which—

Figure 1 represents a perspective view of a Manny reaping-machine to which my improved raking apparatus is attached, the rake being shown in the position which it occupies just before descending to the platform to seize and sweep off the grain. Fig. 2 represents a perspective view of the raking apparatus and a portion of the reaper, the rake being shown in the position which it has when the rake has descended to the platform and is about to commence to sweep the grain from behind the cutters toward the outer end of the platform. Fig. 3 represents a similar view of the same, but with the rake in the position which it has after it has traversed the platform and swept the grain from behind the cutters and is about to push the gavel backward and off the platform. Fig. 4 represents a similar view, showing the position of the rake when it has pushed the grain from the platform and is about to rise therefrom. Fig. 5 represents a similar view of the same, the rake having been raised from the platform and being ready to return to the position shown in Fig. 1. Fig. 6 represents a perspective view of the path described by the point of the outermost tooth of the rake in passing to the different positions represented in the preceding figures, which positions are indicated respectively by the numbers I, II, III, IV, V, corresponding to the number of the figure in which they are shown. Fig. 7 represents a front elevation of the path described by the outermost rake-tooth; and Fig. 8 represents a plan of the under side of the machine represented in Fig. 1, showing the means by which motion is communicated from the driving-wheel to the raking apparatus.

As my improvements only relate to the raking apparatus of reaping-machines, I will describe only so much of a reaper as is necessary to illustrate my said invention.

In the drawings, A represents the platform of a reaping-machine.

B represents the main supporting and driving wheel, upon whose shaft is arranged the main gear-wheel C, which engages with the pinion D, that communicates motion to the reel and cutters. This shaft also carries a pinion that engages with the pinion G on the shaft H, which gives motion to the raking mechanism. The shaft H is supported in suitable bearings beneath the platform, as shown in Fig. 8, and it is connected at I by a universal joint to the diagonal horizontal shaft J, which carries the motion to the rear and outer corner of the frame. This shaft J carries upon it a bevel-pinion, K, gearing with the bevel-pinion L upon the vertical shaft M, which drives the raking mechanism. This shaft has its lower bearing in the frame of the machine, while its upper bearing is in the frame N, which is supported at a suitable height above the platform by rods or standards O. The vertical driving-shaft M carries upon its upper end a horizontal arm, P, hinged or pivoted at its extremity Q to the connecting-link R, which is itself pivoted at S to the movable stage T, which carries the rake. The link R is prolonged beyond the pivot S and forms a tail-piece, U, by means of which the rake is raised and lowered, as hereinafter described. The link R cannot guide the stage, but can merely impart and limit its motion derived from the rotating arm P. The guidance of the stage is effected by means of the horizontal vibrating arms X and Y, pivoted to the stage, respectively, at Z and *a*, and carried upon the vertical rods or shafts V and W. If these vibrating arms were of equal length and the distance between their centers of motion equal to the distance between their points of attachment to the stage, it is evident that the stage, like one part of a parallel ruler, would move parallel to itself, and any point upon it would describe the arc of a circle; but if the above-mentioned lengths or distances are unequal only the points at which the arms are pivoted to the stage will describe arcs of circles. All other points will describe complex curves, and if the distances are properly chosen a point attached to the stage will, during part of its path, describe nearly a straight line, and then a curve of short radius. In the present case the distance between the points Z a, at which the arms X Y are hinged to the stage, is less than the distance between their centers of motion V W, and these points and distances are so arranged that the outermost tooth of the rake or fork will move in a path which is nearly a straight line when it is sweeping the grain from behind the cutters and pressing it against the wing or guard r to form the gavel, and then moves in a short curve while it pushes the grain backward off the platform.

The movable stage T, which carries the rake, is provided with a caster-wheel or friction-roller, b, in order to diminish the friction as it moves back and forth upon the frame N. In the stage are arranged proper bearings for the horizontal axis c, to which the rake-lever d is attached at right angles, and upon which it is free to turn, rising and falling in vertical planes and carrying with it the rake or fork handle e. The rake-lever d is caused to rise and fall by a peculiar arrangement, as follows: Upon its heel or lower end is arranged an arched or curved arm, f, projecting at right angles from it, and so placed that when the rake is down upon the platform the arm is in a vertical position, and when the rake is raised the arm is horizontal. This arm is so curved as to be nearly concentric with the center of motion S of the tail-piece U of the link R, and upon it the tail-piece bears in raising and lowering the rake. The bearing-surface of the curved arm does not meet the rake-lever in a right angle, but the corner is curved downward into a notch, g, into which the tail-piece may slip, and thus the rake be lowered gradually and without any jerk.

The rake-handle e is jointed at about the middle of its length h to the rake-lever d, and upon its lower end it carries the rake-head i, having the fingers j attached to it. Upon its upper end it carries a notched head, k, which overlaps the rake-lever when it is in a horizontal position and the rake is upon the platform, as shown in Figs. 2, 3, and 4. All horizontal strain, therefore, caused by the rake's pressing against the grain, is in a great measure removed from the joint h. If the joint h and lever d formed the only connection between the rake-handle and the stage, the rake, as the lever was raised and lowered, would merely hang suspended from this point, and would be free to vibrate back and forth upon it, and would interfere with the proper working of the reel by striking against the reel-ribs. In order, therefore, to cause it to assume its proper position, a guide-lever, m, is employed, turning upon an axis, n, arranged in proper bearings in arms o o, projecting above the movable stage T, and jointed at p to the rake-handle above its pivotal connection h with the rake-lever d. The guide-bar m is longer than the rake-lever d. Their respective points of attachment to the rake-handle e move in arcs of circles struck from their respective axes c and n. Thus it will be seen that as the rake-handle is raised it will assume a nearly vertical position out of the way of the reel-ribs, as shown in Fig. 5, and it will in this position be returned over the frame N to the outer end of the platform, as shown in Fig. 1, and when lowered it will be caused, as it were, to dive under the reel to seize the grain without interfering with the reel's action.

A guard or shield, q, may be attached to the rake-handle, so as to prevent straw, &c., from getting into and clogging the joints h and p.

The rotating and vibrating arms I prefer to make of curved form to give them more elasticity and enable them the more effectually to resist any strain to which they may be subjected.

The operation of my improved automatic raking apparatus is as follows: In the first position of the rake (see Fig. 1) the vibrating arms X and Y are at the extreme of their motion in one direction, the rotating arm P and link R are near one dead-point, while the tail-piece U is pressing upon the curved projecting arm f, and thus holds the rake-lever d and rake-handle e in a nearly vertical position. As the arm P rotates the dead-point is passed, the arms X Y, and consequently the stage T, move but little, while as the tail-piece U moves over the curved arm f the rake-lever is gradually lowered and the rake pushed, as it were, under the reel until the tail-piece U slips into the notch g and the rake rests over and nearly upon the outer or divider end of the platform, beneath the reel. The raking mechanism now has the position shown in Fig. 2, and the rake itself assumes the position shown at II in Fig. 6. As the arm P continues its rotation the stage is caused to move over the frame N, carrying the rake, which is thus caused to move across the platform behind the cutters in nearly a straight line, sweeping the grain against the wing or guard r, where it is compressed into a gavel. The rake now has the position shown in Fig. 3, and at III in Fig. 6, and is ready to sweep the grain backward off the platform. The rotating arm P is now approaching its other dead-point with reference to the link R and the stage moves on but little with its further rotation. The arms X and Y now turn to the extreme of their motion in this direction, the stage swings round upon a as a pivot and causes the rake to describe an arc, by which movement the grain is pushed off the platform and the rake assumes the position shown in Fig. 4, and at IV in Fig. 6, and it is in readiness to be raised and returned over the platform. While the rake has been moving upon the platform to sweep off the grain the tail-piece U has not been in operation. As the driving-arm, however, continues its revolution the tail-piece presses against the curved projecting arm f and causes it to assume a horizontal position, thus raising the rake-lever, &c., into the position represented in Fig. 5, the position of the rake-head being shown at V in Fig. 6, while at the same time the stage and rake are moved a short distance back upon the frame N. By the further rotation of the arm P the stage T is returned over the frame, carrying with it the rake until they again assume the position shown in Fig. 1, the tail-piece meanwhile pressing upon the curved arm $f$, keeping it in a horizontal and the rake-lever consequently in an erect position. The extent of motion of the stage is limited and regulated by the length of the rotating driving-arm, which must have such relation to the length of the connecting-link that the two dead-points may be passed without any binding or strain.

When the path of a rake is wholly either a straight line or the arc of a circle the means for producing motion in such paths are simple and produce comparatively little friction; but when it is desired that the rake shall move in a complex path—that is, one composed of a straight line and the arc of a circle, or any curve of higher order—slides or guides are generally used to direct the moving parts carrying the rake, and a great amount of friction is thereby produced, causing much wear and tear and great damage to the machine. Such guides might be used to produce the motion of an automatic rake moving and operating as hereinbefore described; but by the employment of the mechanism constituting my invention I am enabled to produce the motion of the rake in a complex path positively and directly with little use of sliding guides, and therefore with comparatively little friction.

It is evident that various modifications might be adopted without departing from the principle of my invention, but the arrangement described is the most convenient and desirable that I have tried. Various methods also may be adopted for communicating motion from the driving-wheel to the raking mechanism.

Having thus described the construction and mode of operation of my improved automatic rake for harvesting-machines, what I claim therein as new, and desire to secure by Letters Patent, is—

1. The combination of the vibrating levers X Y, the support T, and a rake, $i$, substantially as described, whereby the rake is caused to describe a complex path to gather, compress, and discharge the grain by a positive motion, substantially as described.

2. The combination of the tail-piece U or its equivalent, the curved projecting arm $f$ or its equivalent, and the rake, in the manner and for the purposes substantially as specified.

3. The combination of the lever $d$, guide-bar $m$, and the rake, arranged and operating substantially as described.

4. The notched head $k$ or its equivalent on the rake-handle $e$, in combination with the lever $d$, that gives motion to the rake to support the rake-handle, substantially as described.

In testimony whereof I have hereunto subscribed my name.

T. F. KUMS.

Witnesses:
ROB H. TINKER,
WM. A. KNOWLTON.